(12) United States Patent
Maeda et al.

(10) Patent No.: US 6,529,339 B2
(45) Date of Patent: Mar. 4, 2003

(54) LENS AND PRODUCTION METHOD THEREFOR

(75) Inventors: Takanori Maeda, Tsurugashima (JP); Katsuhiro Koike, Tsurugashima (JP); Ikuya Kikuchi, Tsurugashima (JP); Makoto Sato, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/940,675

(22) Filed: Aug. 29, 2001

(65) Prior Publication Data

US 2002/0030899 A1 Mar. 14, 2002

(30) Foreign Application Priority Data

Sep. 4, 2000 (JP) ......................................... 2000-266577

(51) Int. Cl.[7] .............................. G02B 7/02; G02B 3/02
(52) U.S. Cl. ........................................ 359/811; 359/717
(58) Field of Search ................................. 359/642, 718, 359/719, 811, 819, 820, 717

(56) References Cited

U.S. PATENT DOCUMENTS

| | | | | |
|---|---|---|---|---|
| 4,723,833 A | * | 2/1988 | Yamada | 359/820 |
| 5,745,285 A | * | 4/1998 | Harder et al. | 359/356 |
| 6,052,232 A | * | 4/2000 | Iwaki | 359/642 |
| 6,052,233 A | * | 4/2000 | Koike | 359/642 |
| 6,055,111 A | * | 4/2000 | Nomura et al. | 359/642 |
| 6,078,430 A | * | 6/2000 | Fukuda | 359/642 |

OTHER PUBLICATIONS

Japan Optoelectro–Mechanics Association "Optical Device Processing Technology" 84–2–2, pp. 1–7 (with a partial English translation).

* cited by examiner

Primary Examiner—Georgia Epps
Assistant Examiner—Saeed Seyrafi
(74) Attorney, Agent, or Firm—Morgan, Lewis & Bockius LLP (57) ABSTRACT

A lens made of at least one of a resin and glass includes a lens effective diameter area, a peripheral area formed integral with the lens effective diameter area and located at a periphery of the lens effective diameter area, and at least one marker area located in the peripheral area and formed on a circle whose center is a center of the lens effective diameter area.

21 Claims, 12 Drawing Sheets

LENS AND PRODUCTION METHOD THEREFOR

BACKGROUND OF THE INVENTION

1. Field of the Invention

The present invention relates to a lens, such as an objective lens which is used in an optical pickup, and, more particularly, to a single lens, a lens system (which is also simply referred to as a "lens") comprising a plurality of single lenses and a method of producing the lens.

2. Description of the Related Art

Recently, the numerical apertures of objective lenses of pickups used in recording and reproducing information on and from an information recording medium, such as an optical disk, have become greater so as to cope with the demand for recording and reproducing a vast amount of information.

If the numerical aperture is as large as approximately 0.65, a single aspherical lens in use can be prepared by glass press molding or resin molding or a combination of both. If the numerical aperture exceeds that value, an objective lens cannot be prepared by a single lens, needing a combination of two or more single lenses. In case of combining plural lenses, the centers of the rotational symmetry axes of the lenses should be aligned with one another accurately to thereby make the optical axes coincide with one another. Without the alignment, aberration occurs due to the deviation of the axial center, the image forming performance of the objective lens becomes degraded. In particular, a combination objective lens which has a high numerical aperture exceeding 0.8 requires the positional precision of less than several micrometers.

In a case where two spherical lenses are combined, a scheme called "bell clamp type centering" is widely used to ensure relatively easy processing of the outside diameters with centers being the centers of their spherical surfaces. (See Japan Optoelectro-Mechanics Association, "Optical Device Processing Technology" 84-2-2, p. 5.)

In a case where an aspherical lens is combined with a lens or a lens-barrel, by way of contrast, various problems arise. The aforementioned diameter processing is difficult on an aspherical shape and cannot be carried out with high precision. Further, a sufficient accuracy cannot be obtained when the outside diameter as of the time of pressing is used as it is. With the structure where an aspherical lens is adhered with its outside diameter matched with that of a lens-barrel, therefore, a combination lens including the aspherical lens cannot provide a sufficient precision.

In this respect, "reflection type centering" and "centering with an auto collimator" are used to align, particularly, a combination objective lens having a high numerical aperture that demands a precision of the order of several micrometers. That is, a lens whose outside diameter is smaller than that of a lens-barrel is prepared, centering of the lens is performed while measuring the center of the aspherical surface and the lens is adhered to the lens-barrel when the centering is properly carried out.

According to such a scheme, however, the lens is actually irradiated with light and the aspherical surface is measured while the lens is turned in the lens assembling process. This results in low workability. Such schemes suffer a difficulty in keeping the lens performance at the time of measurement, due to the positional deviation that may occur when the adhesive is cured and the residual stress rises. The same problem arose not only when two lenses were assembled into a single lens system but also when the center of the aspherical surface of a single lens was accurately aligned with the center of a lens-barrel.

OBJECT AND SUMMARY OF THE INVENTION

Accordingly, the present invention has been achieved in order to solve such problems, and it is an object of the present invention to provide a lens and a production method therefor, which can form a lens accurately and can improve the production yield.

According to the present invention, a lens made of at least one of a resin and glass, includes:

a lens effective diameter area;

a peripheral area formed integral with the lens effective diameter area and located at a periphery of the lens effective diameter area; and at least one marker area located in the peripheral area and formed on a circle whose center is a center of the lens effective diameter area.

In one aspect of the lens of the present invention, said marker area is a circle whose center is said center of said lens effective diameter area or a recess or a projection which is a part of said circle.

In another aspect of the lens of the present invention, said marker area includes independent small lens shapes.

In a further aspect of the lens of the present invention, said lens is a combination lens acquired by combining a plurality of lenses.

In a still further aspect of the lens of the present invention, said lens has a lens-barrel having a lens seat portion which supports said lens and at which an indication marker area at least partially aligned with a circle whose center is said center of said lens effective diameter area is provided.

According to the present invention, a method of producing a lens having a lens effective diameter area and a peripheral area formed integral with the lens effective diameter area and located at a periphery of the lens effective diameter area, comprises the steps of:

forming, together with the lens effective diameter area and the peripheral area, a lens made of at least either a resin or glass and having at least one marker area located in the peripheral area at the periphery of the lens effective diameter area and formed on a circle whose center is a center of the lens effective diameter area;

preparing a cooperative member having an indication marker area at least partially aligned with a circle whose center is the center of the lens effective diameter area; and aligning the marker area with the indication marker area and fixing the lens to the cooperative member.

In one aspect of the method of the present invention, said marker area and said indication marker area are circles whose centers are said center of said lens effective diameter area or recesses or projections which are parts of said circles.

In another aspect of the method of the present invention, said marker area and said indication marker area are positioned in contact with each other.

In a further aspect of the method of the present invention, said at least one marker area has independent small lenses which are positioned in such a way that when said center of said lens effective diameter area coincides with a predetermined optical axis, an image of said indication marker area is observed through said small lenses from a predetermined position on said optical axis.

In a still further aspect of the method of the present invention, said cooperative member is a lens or a lens-barrel.

DETAILED DESCRIPTION OF THE PREFERRED EMBODIMENTS

Preferred embodiments of the present invention are described below referring to the accompanying drawings.

Figure 1A:
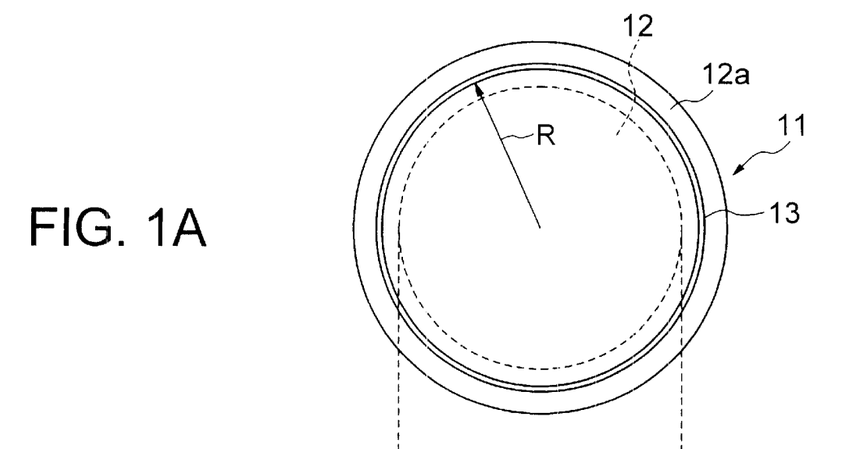
FIGS. 1A and 1B are exemplary front and cross-sectional views respectively showing a lens according to one embodiment of the present invention.
Figure 1B:
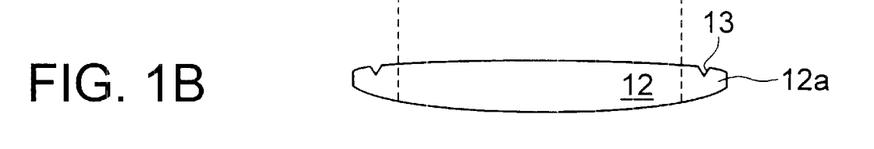
Figure 2A:
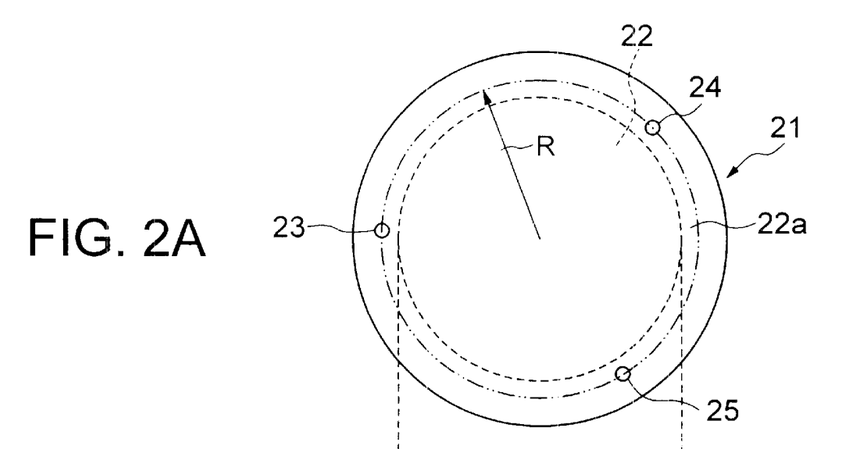
FIGS. 2A and 2B are exemplary front and cross-sectional views showing a lens according to another embodiment of the present invention.
Figure 2B:
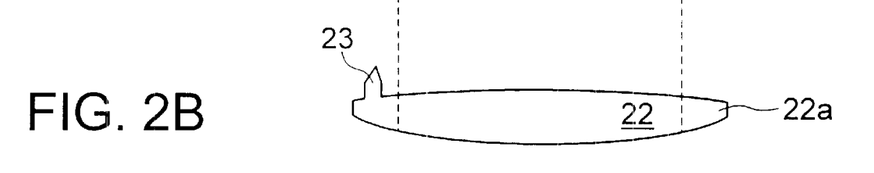

FIGS. 1 and 2 show a first structural example of an aspherical lens embodying the present invention.

FIG. 1A presents a front view of a first lens 11. The first lens 11 is an aspherical lens obtained by glass press molding and has a lens effective diameter area 12 and a peripheral area 12a provided around the area 12. The peripheral area 12a that has been pressed together with the lens effective diameter area 12 has a shallow circular V groove 13 or a marker area molded at the same time as glass press molding is carried out. The circular V groove has the same center as the center curvature of the aspherical surface of the lens effective diameter area 12. FIG. 1B is a cross-sectional view of the first lens 11 at the center.

FIG. 2A is a front view of a second lens 21 which is to be combined with the first lens 11 and is made, for example, by resin molding. The second lens 21 likewise has a lens effective diameter area 22 and a peripheral area 22a provided around the area 22. The peripheral area 22a is provided with hemispherical small projections 23, 24 and 25 or marker areas at three points on a circle which has the same center as the center curvature of the aspherical surface of the lens effective diameter area 22. That is, the radius of the circle (two-dot chain line) that passes the three small projections 23, 24 and 25 is set equal to the radius of the circular V groove 13 of the first lens 11. It is preferable that the center of the circle that passes the three points should be the same as the center of the center curvature of the aspherical surface in the effective diameter area and the small projections should be provided at three or more points. The small projections should have the same height. FIG. 2B is a cross-sectional view of the second lens 21.

Figure 3:
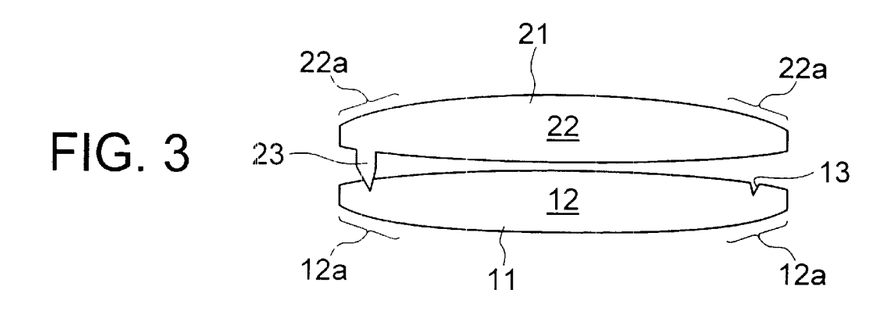
FIG. 3 is a cross-sectional view of a combination lens according to another embodiment of the present invention.

The following discusses the action of the first structural example. As shown in FIG. 3, the first lens 11 and the second lens 12 are assembled together in such a way that the two face each other based on their marker areas. At this time, the small projections 23, 24 and 25 are fitted in the circular V groove 13 of the first lens 11 and the center position of the circle passing the small projections 23, 24 and 25 coincides with the center position of the first lens 11. As the small projections 23, 24 and 25 and the circular V groove are molded together with their aspherical shapes in the effective diameter areas, simply placing one lens over the other can align the center of the first lens 11 with the center of the second lens 21 very accurately. To correct aberration the aspherical surface of a lens itself suffers, one of the lenses may be turned. Because the lens can be turned with its center aligned with the center of the other lens, the structure is suitable at the time of adjusting the rotation.

The first structural example can allow the centers of the lens effective diameter areas of two lenses to be aligned with high precision in a case where aspherical lenses which cannot be subjected to centering or edging are used.

Although the positioning projections have hemispherical shapes and the positioning recess takes the shape of a V groove in the first structural example, those structures are not restrictive and other various structures are possible as long as positioning can be carried out properly.

Figure 4A:
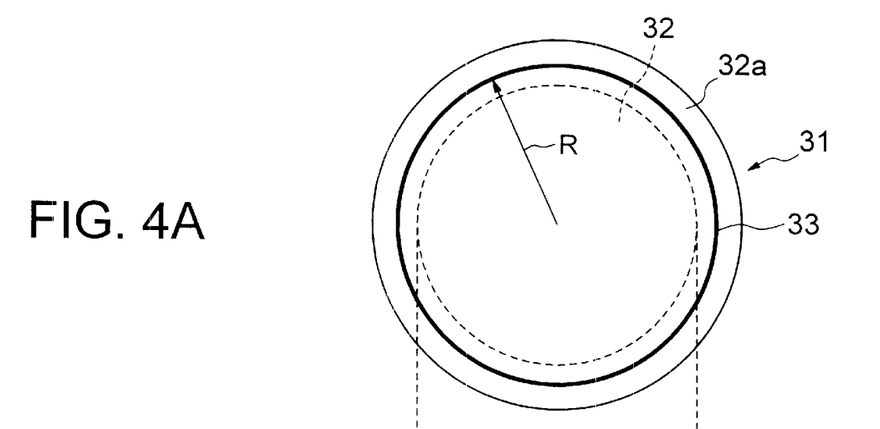
FIGS. 4A and 4B are exemplary front and cross-sectional views showing a lens according to another embodiment of the present invention.
Figure 4B:
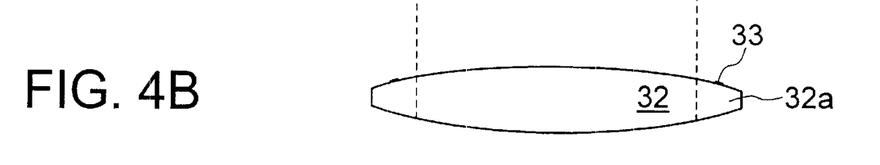
Figures 5A, 5B:
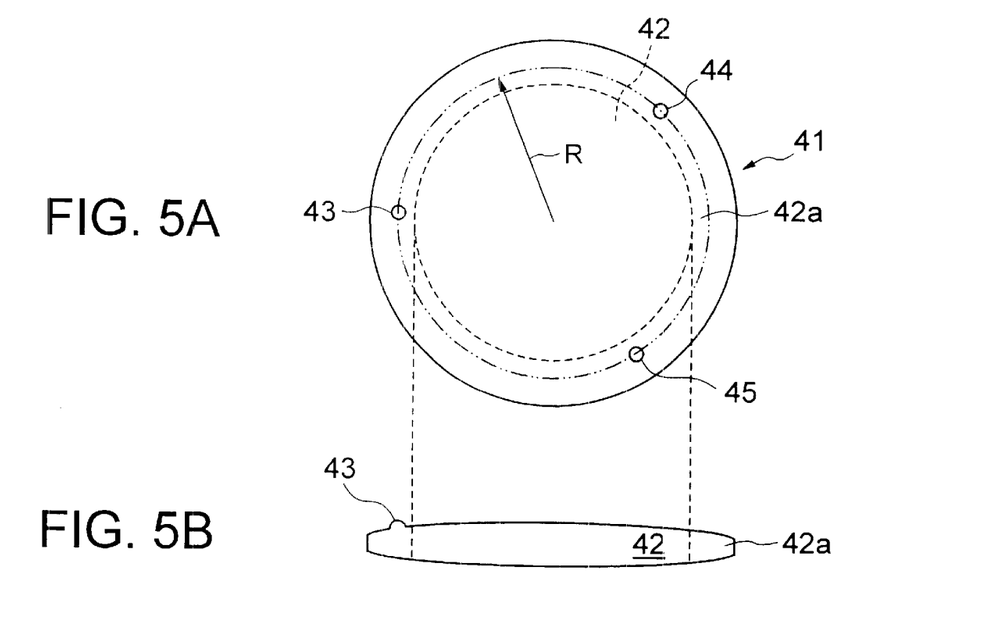
FIGS. 5A and 5B are exemplary front and cross-sectional views showing a lens according to a second embodiment of the present invention.

Lenses for use in a second structural example are illustrated in FIGS. 4 and 5.

FIG. 4A presents a front view of a first lens 31. FIG. 4B is a cross-sectional view of the first lens 31. The first lens 31 has a lens effective diameter area 32 and a peripheral area 32a provided integral with the lens effective diameter area 32 by molding at the periphery of the area 32. Carved in the peripheral area 32a is a circular rule 33 or an indication marker area whose center is the same as the center of the center curvature of the aspherical surface of the lens effective diameter area 32. The center of the circle of the rule 33 is the same as the centers of the aspherical lens and the lens effective diameter area 32. The circle of the rule 33 is carved at the time of press molding of the lens in such a way that its reflectance or transmittance differs from that of an area around that circle. The rule 33 need not have a groove shape but may have a protruding shape or a minute undulating shape.

FIG. 5A presents a front view of a second lens 41. FIG. 5B is a cross-sectional view of the second lens 41. As illustrated, the second lens 41 likewise has a lens effective diameter area 42 and a peripheral area 42a provided integral with the lens effective diameter area 42 by molding at the periphery of the area 42. Convex lenses 43, 44 and 45 or marker areas are partially formed in the peripheral area 42a at three points on a circle whose center is the same as the center of the center curvature of the aspherical surface of the lens effective diameter area 42. The three convex lenses are small lenses whose radii do not reach the lens effective diameter area 42. The radius of the center that passes the three convex lenses 43, 44 and 45 is set equal to the radius of the circular rule 33 of the indication marker area of the first lens 31.

Figure 6:
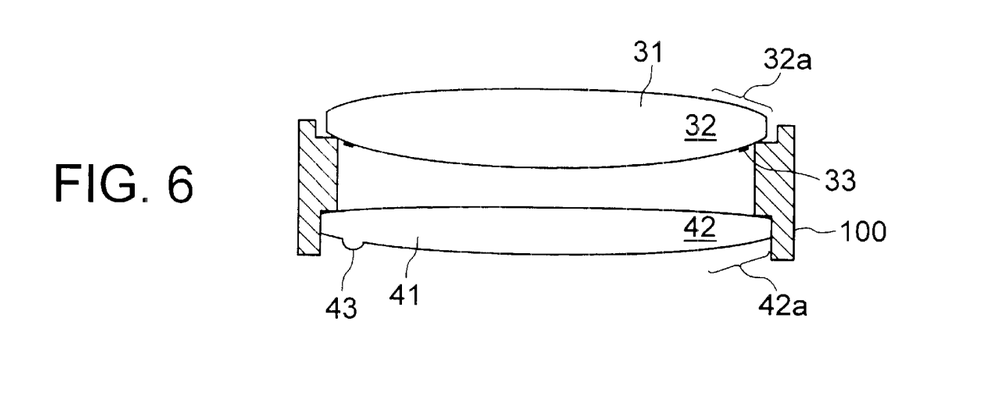
FIG. 6 is a cross-sectional view of a combination lens according to the second embodiment of the present invention.

The following discusses the action of the second structural example. In this structural example, as shown in FIG.

6, the first and second lenses 31 and 41 are assembled via a cooperative member 100 such as a lens-barrel, and are secured through observation by eyes or a camera from the direction of the second lens 41. The states that are observed then are shown in partly enlarged, cutaway front views of the second lens 41 in FIGS. 7 to 12.

Figure 7:
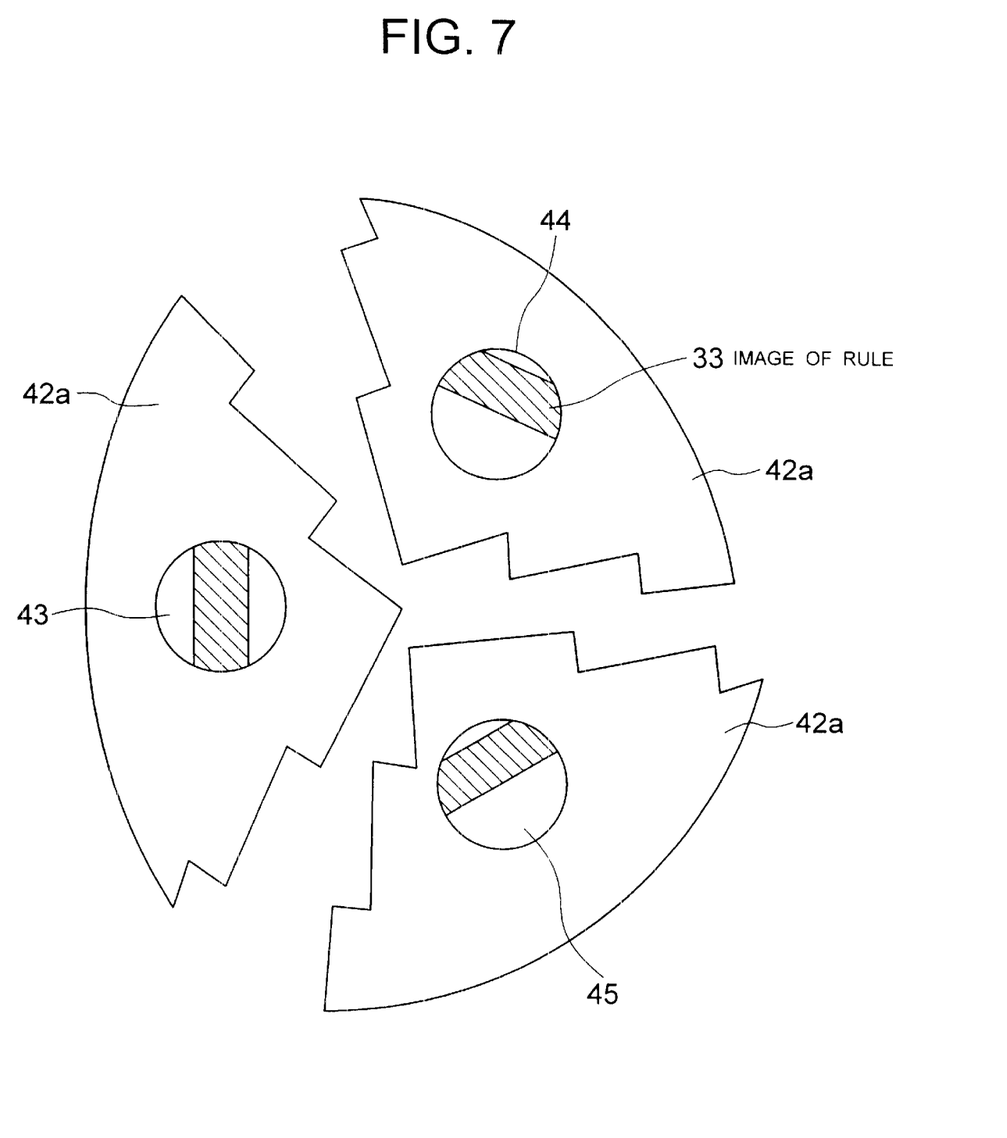
FIGS. 7 to 12 are partly enlarged, cutaway front views of the lens according to the second embodiment of the present invention.
Figure 8:
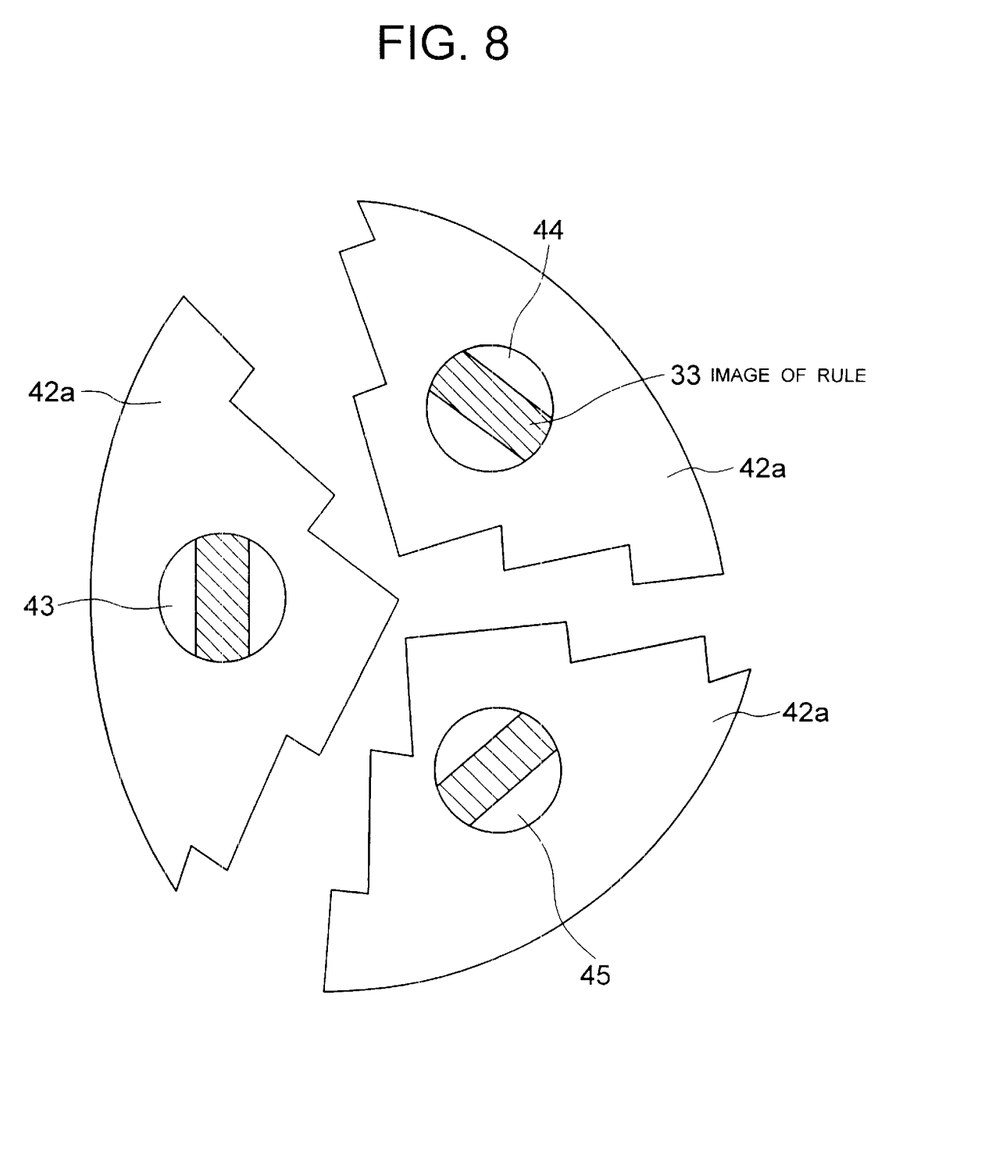
Figure 9:
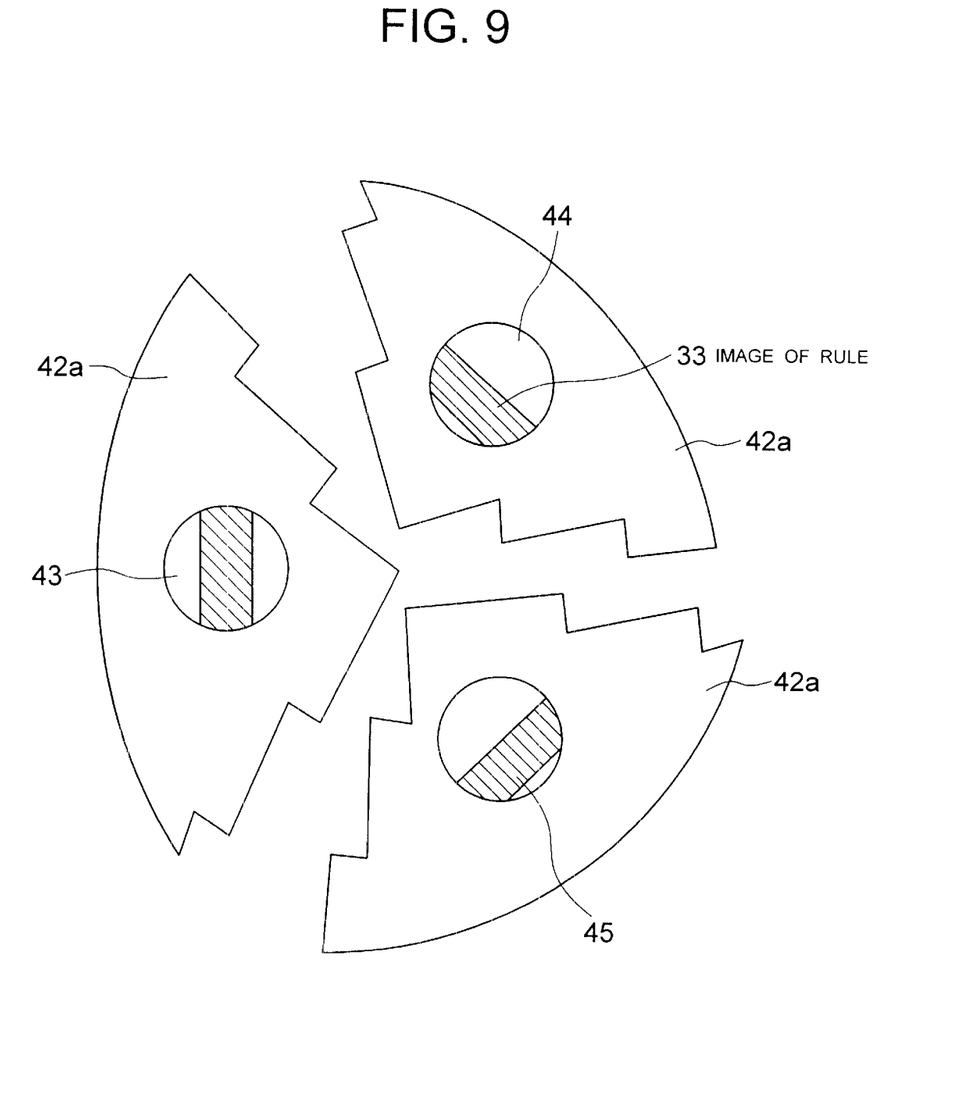

FIG. 7 shows a state where the center of the second lens 41 is shifted upward from the center of the first lens 31. FIG. 8 shows a state where the center of the second lens 41 is aligned with the center of the first lens 31. FIG. 9 shows a state where the center of the second lens 41 is shifted downward from the center of the first lens 31. As the images of the rule 33 that are seen through the three small lenses 43, 44 and 45 become identical, the centers of the first and second lenses 31 and 41 are aligned with each other.

Figure 10:
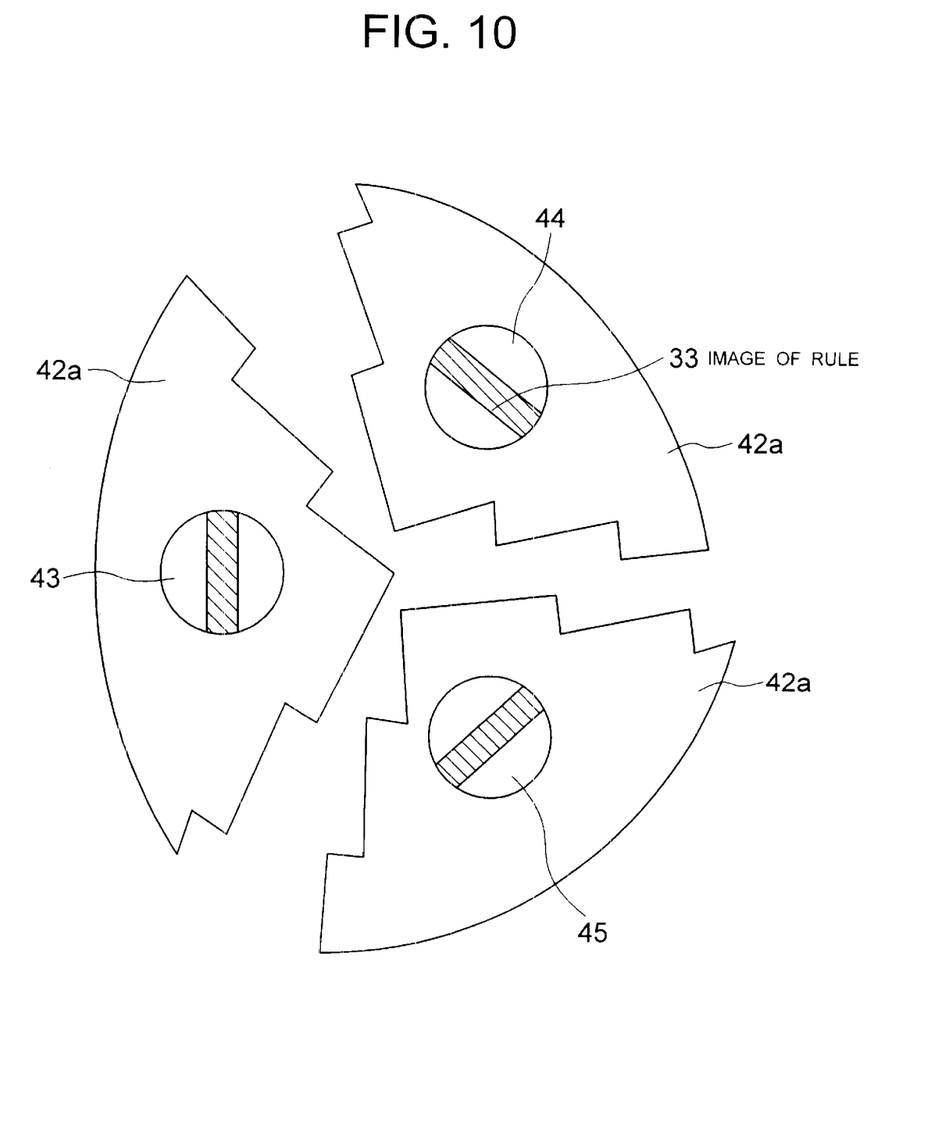
Figure 11:
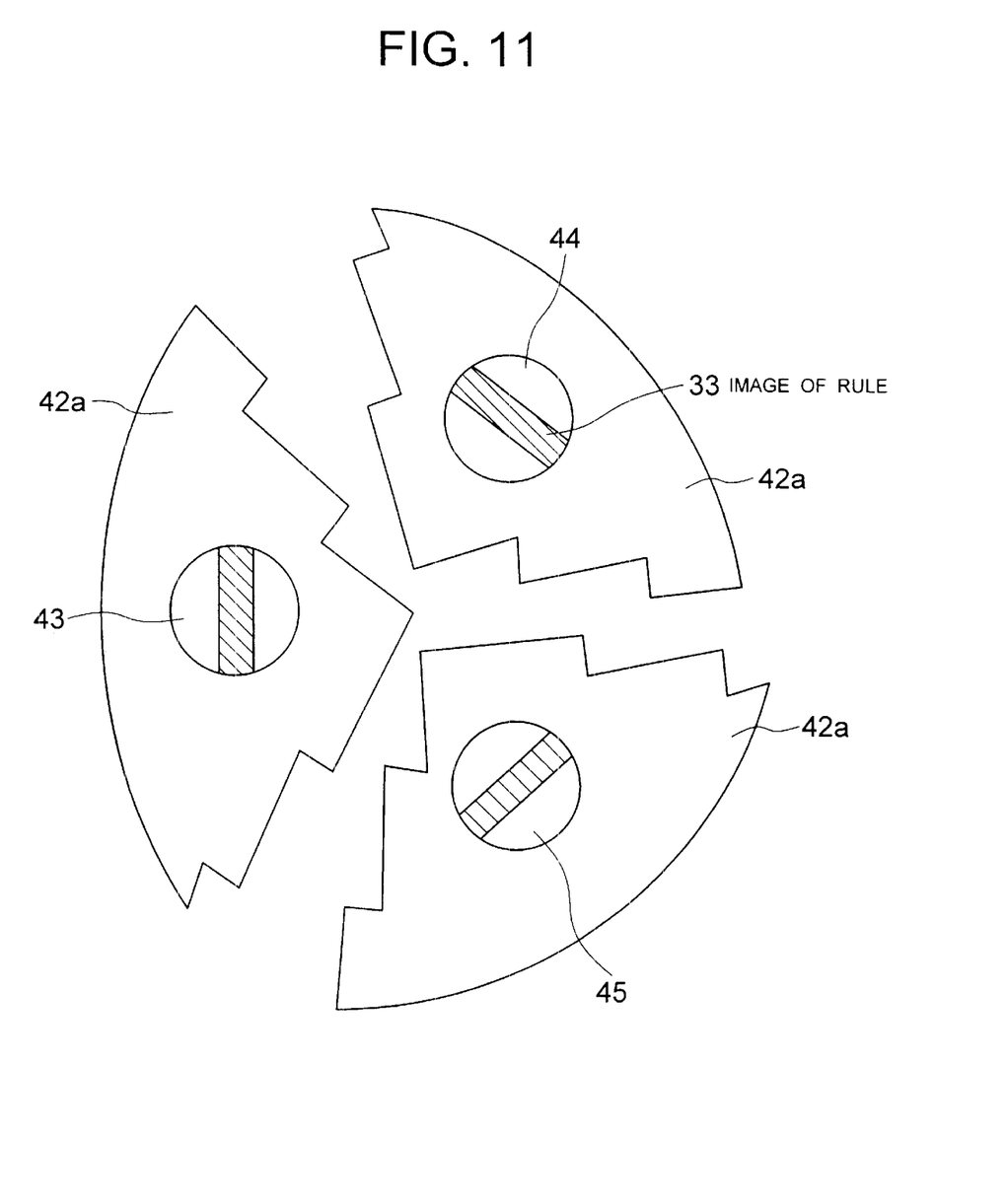
Figure 12:
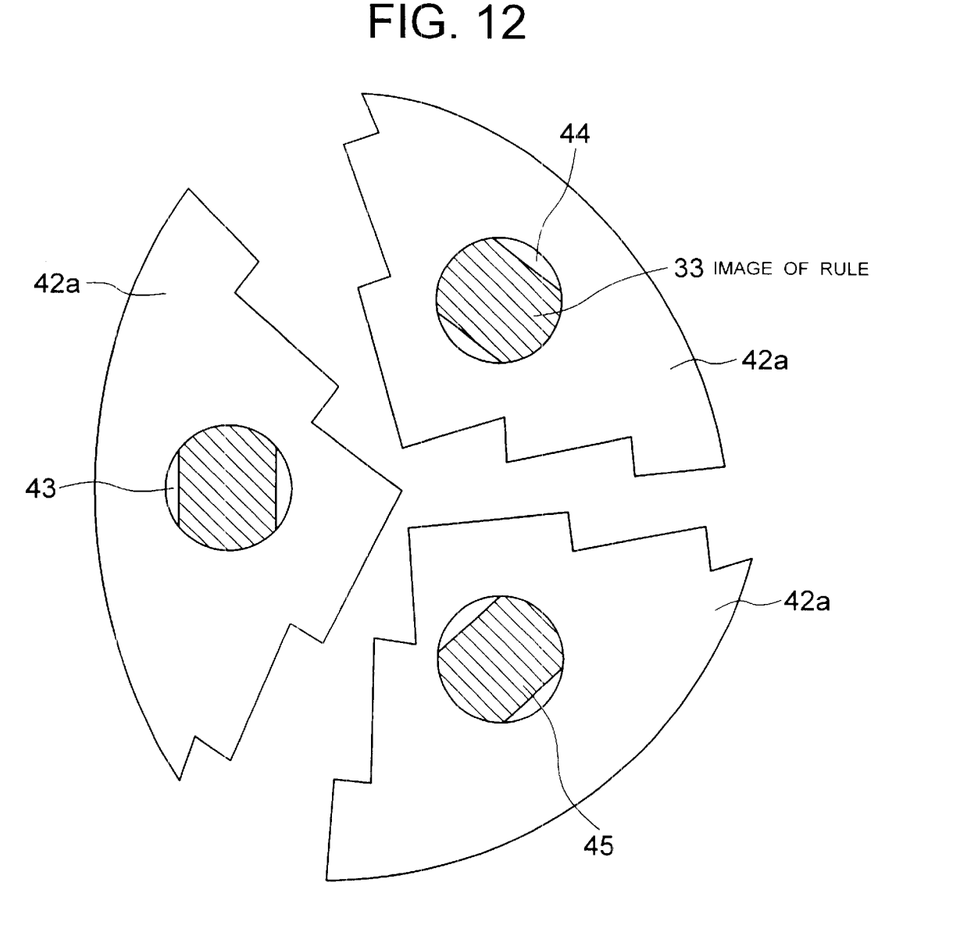

The observed states can permit an observer to know the distance between the first and second lenses 31 and 41. The states that are observed then are illustrated in partly enlarged, cutaway front views of the second lens 41 in FIGS. 10 to 12. FIG. 10 shows an observed state where the distance between the first and second lenses 31 and 41 is short, FIG. 11 shows an observed state where the distance is as designed, and FIG. 12 shows an observed state where the first and second lenses 31 and 41 are positioned far from each other.

Figure 13:
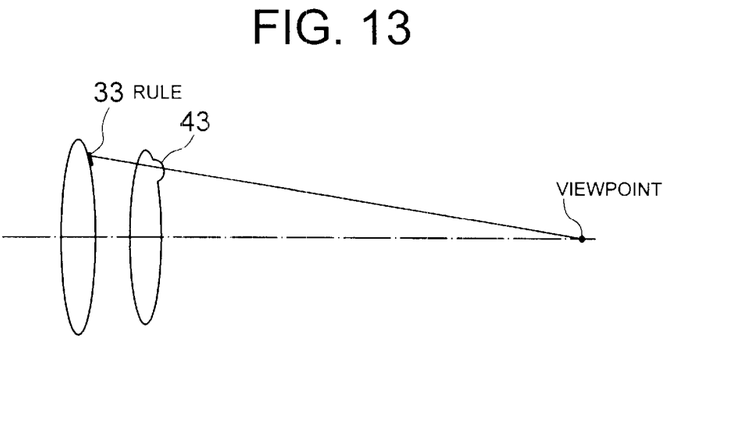
FIG. 13 is a cross-sectional view of the combination lens according to the second embodiment of the present invention.

The diameter and width of the circle of the rule 33 are selected based on the focal distance of the lens, the distance between the lenses and the position of the viewpoint where observation is conducted. As shown in FIG. 13, the positional relationship between the first and second lenses 31 and 41 then is such that the circle of the rule 33 is seen from the viewpoint through the three small lenses 43, 44 and 45.

According to the second structural example, as apparent from the above, the center positions can easily be aligned with each other without using a centering apparatus or the like.

Figure 14A:
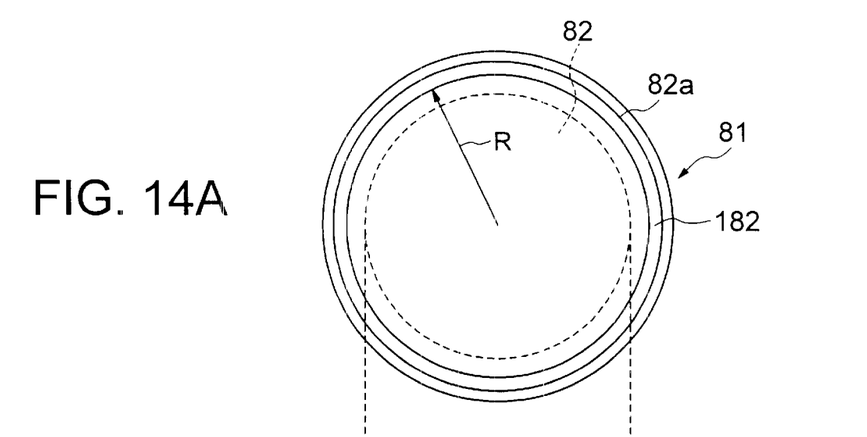
FIGS. 14A and 14B are exemplary front and cross-sectional views showing a lens according to a third embodiment of the present invention.
Figure 14B:
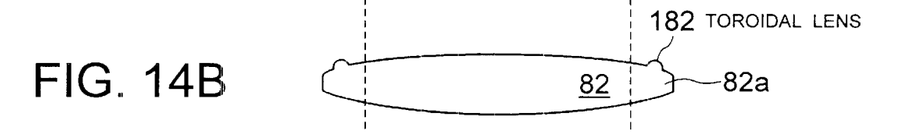

A third structural example has the same structure as the second structural example except that the second lens 41 is replaced with a second lens 81 which has a doughnut-like toroidal lens surface 182 instead of the three convex lenses 43, 44 and 45 of the second lens 41. FIG. 14A presents a front view of the second lens 81. FIG. 14B is a cross-sectional view of the second lens 81. As illustrated, the second lens 81 likewise has a lens effective diameter area 82 and a peripheral area 82a provided integral with the lens effective diameter area 82 by molding at the periphery of the area 82. Formed in the peripheral area 82a is the toroidal lens surface 182 or a marker area on a circle whose center is the same as the center of the center curvature of the aspherical surface of the lens effective diameter area 82. The toroidal lens surface 182 is a small lens whose radius does not reach the lens effective diameter area 82.

The following discusses the action of the third structural example. In this structural example, like the second structural example shown in FIG. 6, the first and second lenses 31 and 81 are assembled via the cooperative member 100 such as a lens-barrel, and are secured through observation by eyes or a camera from the direction of the second lens 81. The states that are observed then are shown in the schematic front views of the second lens 81 in FIGS. 15 to 17.

Figure 15:
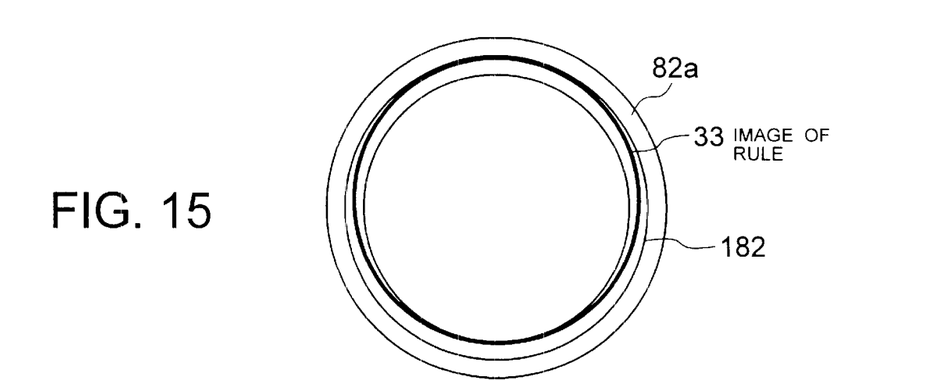
FIGS. 15 to 17 are schematic front views of the lens according to the third embodiment of the present invention.
Figure 16:
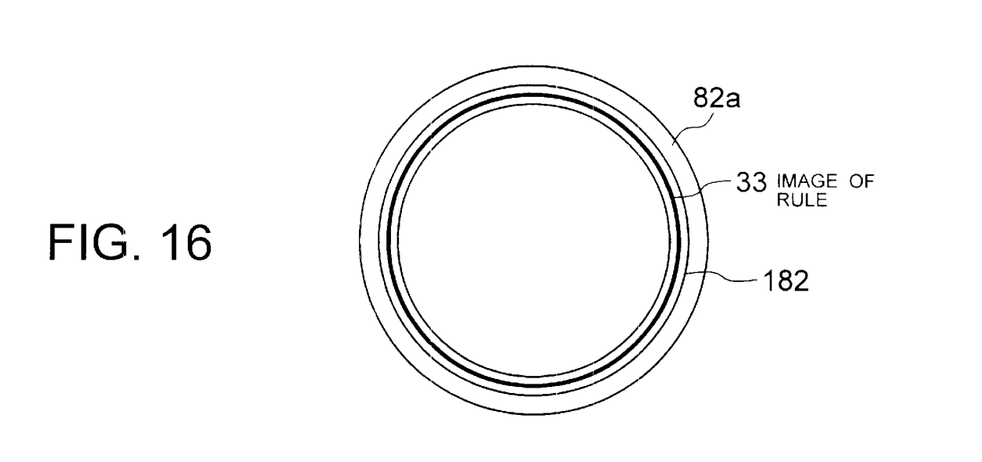
Figure 17:
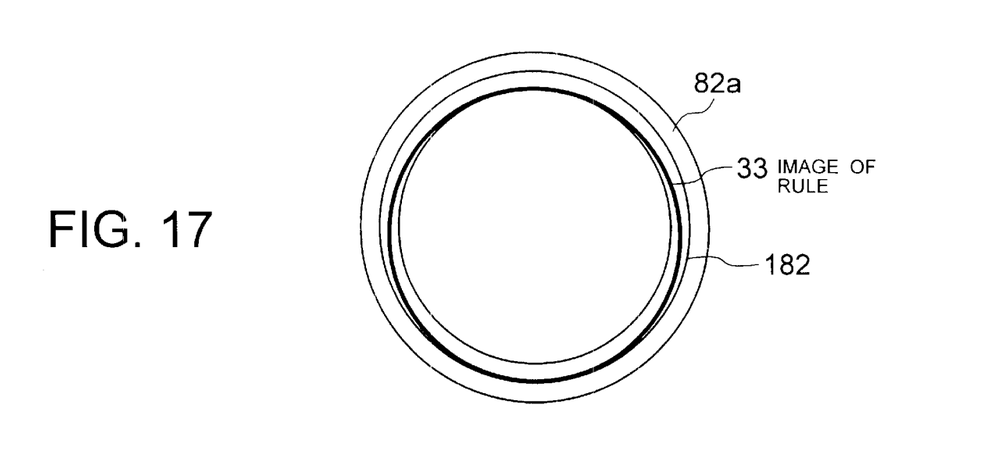

FIG. 15 shows a state where the center of the second lens 81 is shifted upward from the center of the first lens 31. FIG. 16 shows a state where the center of the second lens 81 is aligned with the center of the first lens 31. FIG. 17 shows a state where the center of the second lens 81 is shifted downward from the center of the first lens 31. As the image of the rule 33 that is seen through the toroidal lens surface 182 becomes concentrical to the circle of the toroidal lens surface 182, the centers of the first and second lenses 31 and 81 are aligned with each other.

Figure 18:
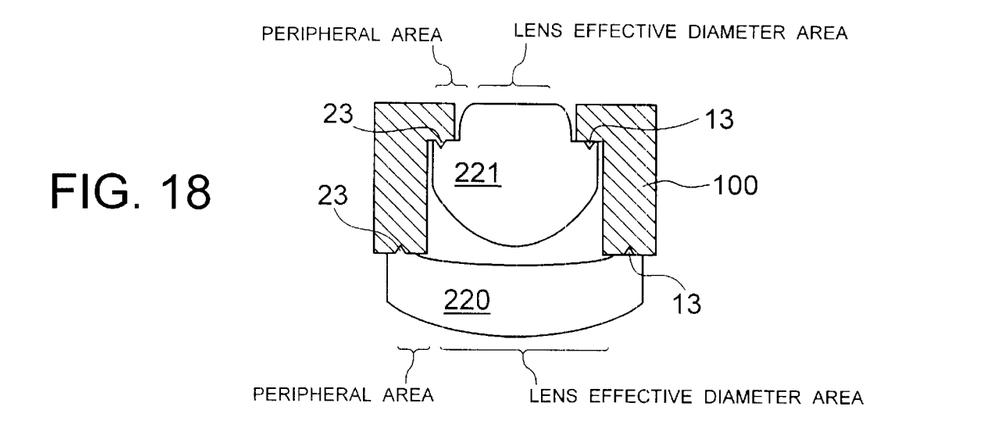
FIGS. 18 to 20 are cross-sectional views each showing a modification of the combination lenses of the first to third embodiments of the present invention.

Although the relative positions of two lenses are directly aligned with each other in the first to third structural examples, one of the lenses may be changed to a lens-barrel 100 so that the other lens is attached to the lens-barrel 100 at the proper position as shown in FIG. 18. If at least three small projections 23 and a circular V groove 13 are provided on each of the top and bottom of the lens-barrel 100, an excellent positional precision can be provided for two lenses 220 and 221 that are to be adhered to the lens-barrel 100.

Figure 19:
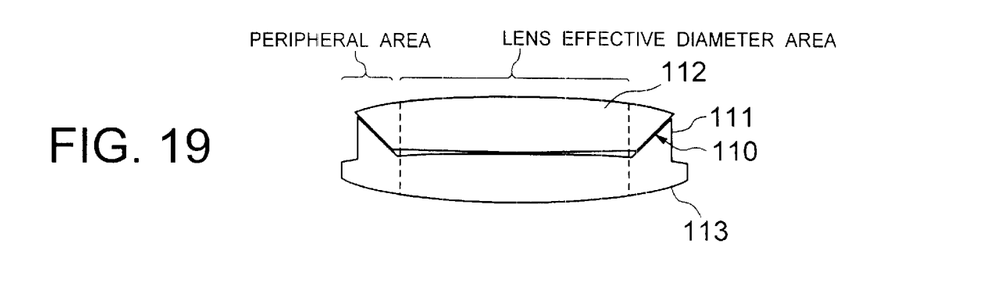

FIG. 19 is a cross-sectional view showing a structural example that has a first lens 112 having a conical inclined surface 110 and a second lens 113 having a reference projection 111 which is so determined as to contact the inclined surface 110 at the same angle as the angle of the inclined surface 110. According to the present invention, not only a circular V groove but also the conical inclined surface 110 can be used.

Figure 20:
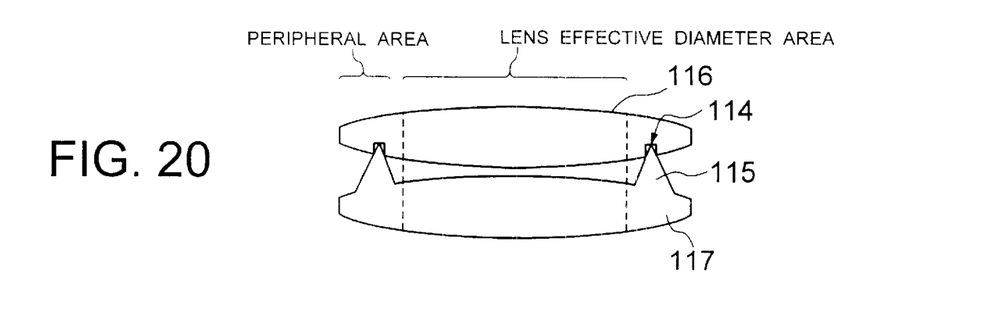

FIG. 20 is a cross-sectional view showing a structural example that has a first lens 116 having a circular groove 114, not a circular V groove, which has a recessed portion with a rectangular cross section, or a part of the circular groove 114, and a second lens 117 having a conical projection 115 which corresponds to the full or partial circular groove 114.

In case of the structure where glass lenses are attached to each other, lenses with similar shapes may be provided by molding the lenses in such a way as to form a circular recess, not a spherical projection, and placing micro beads in the recess.

Although one of the lenses is designed to have a circular marker area in the structural examples in consideration of the case the lenses are turned, the same advantages can be acquired by forming a part of a circle only in that portion which corresponds to the reference projection in a case where the lenses need not be turned or should be turned within a limited range.

In short, according to the present invention, a positioning marker area which can specify the center position is formed in an area outside the effective diameter area at the time of making an aspherical surface, thereby reducing an assembling error of an aspherical combination lens or single lenses. This can ensure accurate lens assembling and improve the production yield.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2000-266577 which is hereby incorporated by reference.

What is claimed is:

1. A combination lens comprising:
    a first lens which includes:
        a first lens effective diameter area having a first optical axis;
        a first peripheral area formed integral with said first lens effective diameter area and located at a periphery of said first lens effective diameter area; and a first circular marker area located in said first peripheral area and centered on the first optical axis of said first lens effective diameter area and including a circular groove centered on the first optical axis of said first lens effective diameter area; and a second lens which includes:
  a second lens effective diameter area having a second optical axis;
  a second peripheral area formed integral with said second lens effective diameter area and located at a periphery of said second lens effective diameter area; and
  a second circular marker area located in said second peripheral area and centered on the second optical axis of said second lens effective diameter area, and including at least three projections arranged on a circle centered on the second optical axis of said second lens effective diameter area in contact with the circular groove of said first lens.

2. A combination lens comprising:
a first lens which includes:
  a first lens effective diameter area having a first optical axis;
  a first peripheral area formed integral with said first lens effective diameter area and located at a periphery of said first lens effective diameter area; and
  a first circular marker area located in said first peripheral area and centered on the first optical axis of said first lens effective diameter area and including a circular rule centered on the first optical axis of said first lens effective diameter area, and having a reflectance or transmittance differing from that of said first peripheral area; and
a second lens which includes:
  a second lens effective diameter area having a second optical axis,
  a second peripheral area formed integral with said second lens effective diameter area and located at a periphery of said second lens effective diameter area; and
  a second circular marker area located in said second peripheral area and centered on the second optical axis of said second lens effective diameter area, and including a small lens region arranged on a circle centered on the second optical axis of said second lens effective diameter area,
  wherein said first and second lenses are positioned in such a way that said circular rule is observed through said small lens region from a viewpoint on said first optical axis such that the first and second optical axes of said first and second lens effective diameter areas coincide with each other.

3. The combination lens according to claim 2, wherein said small lens region has at least three convex lenses arranged on a circle centered on the second optical axis of said second lens effective diameter area.

4. The combination lens according to claim 2, wherein said small lens region has a toroidal lens surface centered on the second optical axis of said second lens effective diameter area.

5. The combination lens according to claim 2, further comprising a lens-barrel having lens seat portions to support said first and second lenses.

6. A combination lens comprising:
a lens which includes:
  a lens effective diameter area having an optical axis;
  a peripheral area formed integral with said lens effective diameter area and located at a periphery of said lens effective diameter area; and
  a circular marker area located in said peripheral area and centered on the optical axis of said lens effective diameter area and including a circular groove centered on the optical axis of said lens effective diameter area; and
a lens-barrel having a lens seat portion which has at least three projections arranged on a circle centered on the optical axis of said lens effective diameter area.

7. A combination lens comprising;
a first lens which includes:
  a first lens effective diameter area having a first optical axis;
  a first peripheral area formed integral with said first lens effective diameter area and located at a periphery of said first lens effective diameter area; and
  a first circular marker area located in said first peripheral area and centered on the first optical axis of said first lens effective diameter area, and including a first conical inclined surface centered on the optical axis of said first lens effective diameter area; and
a second lens which includes:
  a second lens effective diameter area having a second optical axis;
  a second peripheral area formed integral with said second lens effective diameter area and located at a periphery of said second lens effective diameter area; and
  a second circular marker area located in said second peripheral area and centered on the second optical axis of said second lens effective diameter area, and including a second conical inclined surface complement to said first conical inclined surface of said first lens and centered on the second optical axis of said second lens effective diameter area in contact with the first conical inclined surface.

8. A method of producing a combination lens comprising the steps of:
providing a first lens which includes:
  a first lens effective diameter area having a first optical axis;
  a first peripheral area formed integral with said first lens effective diameter area and located at a periphery of said first lens effective diameter area; and
  a first circular marker area located in said first peripheral area and centered on the first optical axis of said first lens effective diameter area and including a circular groove centered on the first optical axis of said first lens effective diameter area;
providing a second lens which includes:
  a second lens effective diameter area having a second optical axis;
  a second peripheral area formed integral with said second lens effective diameter area and located at a periphery of said second lens effective diameter area; and
  a second circular marker area located -in said second peripheral area and centered on the second optical axis of said second lens effective diameter area and including at least three projections arranged on a circle centered on the second optical axis of said second lens effective diameter area in contact with the circular groove of said first lens; and
assembling said first and the second lenses together in such a way that said first and second circular marker areas face one another such that the circular groove comes in contact with the projections.

9. A method of producing a combination lens comprising the steps of:
provproviding a first lens which includes:
a first lens effective diameter area having a first optical axis;
a first peripheral area formed integral with said first lens effective diameter area and located at a periphery of said first lens effective diameter area; and
a first circular marker area located In said first peripheral area and centered on the first optical axis of said first lens effective diameter area, and including a first conical inclined surface centered on the optical axis of said first lens effective diameter area;
providing a second lens which includes:
a second lens effective diameter area having a second optical axis,
a second peripheral area formed integral with said second lens effective diameter area and located at a periphery of said second lens effective diameter area; and
a second circular marker area located in said second peripheral area and centered on the second optical axis of said second lens effective diameter area, and including a second conical inclined surface complement to said first conical inclined surface of said first lens and centered on the second optical axis of said second lens effective diameter area; and
assembling said first and the second lenses together in such a way that said first and second circular marker areas face one another such that the first and second conical inclined surfaces of said first and second lenses come in contact with one another.

10. A method of producing a combination lens comprising the steps of:
providing a first lens which includes:
a first lens effective diameter area having a first optical axis;
a first peripheral area formed integral with said first lens effective diameter area and located at a periphery of said first lens effective diameter area; and
a first circular marker area located in said first peripheral area and centered on the first optical axis of said first lens effective diameter area, and including a circular rule centered on the first optical axis of said first lens effective diameter area and having a reflectance or transmittance differing from that of said first peripheral area;
providing a second lens which includes:
a second lens effective diameter area having a second optical axis;
a second peripheral area formed integral with said second lens effective diameter area and located at a periphery of said second lens effective diameter area; and
a second circular marker area located in said second peripheral area and centered on the second optical axis of said second lens effective diameter area, and including a small lens region arranged on a circle centered on the second optical axis of said second lane effective diameter area; and
aligning the first and second optical axes of said first and second lenses through observation such that the circular rule is seen through the small lens region from a viewpoint on said first optical axis to fix said first and second lenses to each other.

11. The method according to claim 10, wherein said small lens region has at least three convex lenses arranged on a circle centered on the second optical axis of said second lens effective diameter area.

12. The method according to claim 10, wherein said small lens region has a toroidal lens surface centered on the second optical axis of said second lens effective diameter area.

13. The method according to claim 10, further comprising a step of providing a lens-barrel having lens seat portions to support said first and second lenses.

14. A lens having an optical axis aligned with an optical axis of an other lens comprising:
a lens effective diameter area having an optical axis;
a peripheral area formed integral with said lens effective diameter area and located at a periphery of said lens effective diameter area; and
a circular marker area located in said peripheral area and centered on the optical axis of said lens effective diameter area in contact with the other lens.

15. The lens according to claim 14, wherein said circular marker area has a circular groove centered on the optical axis of said lens effective diameter area.

16. The lens according to claim 14, wherein said circular marker area has at least three projections arranged on a circle centered on the optical axis of said lens effective diameter area.

17. The lens according to claim 14, wherein said circular marker area has a conical inclined surface centered on the optical axis of said lens effective diameter area.

18. A lens having an optical axis aligned with an optical axis of an other lens comprising:
a lens effective diameter area having an optical axis;
a peripheral area formed integral with said lens effective diameter area and located at a periphery of said lens effective diameter area; and
a circular marker area located in said peripheral area and centered on the optical axis of said lens effective diameter area to be used for alignment in conjunction with the other lens.

19. The lens according to claim 18, wherein said circular marker area has a circular rule centered on the optical axis of said lens effective diameter area and having a reflectance or transmittance differing from that of said peripheral area.

20. The lens according to claim 18, wherein said circular marker area has at least three convex lenses arranged on a circle centered on the optical axis of said lens effective diameter area.

21. The lens according to claim 18, wherein said circular marker area has a toroidal lens surface centered on the optical axis of said lens effective diameter area.

* * * * *